United States Patent [19]
Salfinger et al.

[11] Patent Number: 5,927,736
[45] Date of Patent: Jul. 27, 1999

[54] MOBILE CHASSIS

[75] Inventors: Paul Francis Salfinger; Brian John Salfinger, both of Balcatta, Australia

[73] Assignee: Lendal Pty Ltd, Australia

[21] Appl. No.: 08/836,868

[22] PCT Filed: Nov. 8, 1995

[86] PCT No.: PCT/AU95/00741

§ 371 Date: Jul. 24, 1997

§ 102(e) Date: Jul. 24, 1997

[87] PCT Pub. No.: WO96/14217

PCT Pub. Date: May 17, 1996

[30] Foreign Application Priority Data

Nov. 8, 1994 [AU] Australia ............... PM9326

[51] Int. Cl.$^6$ ............................................. B60G 21/045
[52] U.S. Cl. ........................................ 280/104; 280/682
[58] Field of Search ................................ 280/104, 682

[56] References Cited

U.S. PATENT DOCUMENTS

| | | | |
|---|---|---|---|
| 3,313,555 | 4/1967 | Reimer | 280/104 |
| 3,338,327 | 8/1967 | Bishop | 180/71 |
| 3,504,928 | 4/1970 | Reimer | 280/104 |
| 3,537,720 | 11/1970 | Irgens | 280/104 |
| 3,917,306 | 11/1975 | Madler et al. | 280/104 |
| 5,547,207 | 8/1996 | Madler | 280/104 |

FOREIGN PATENT DOCUMENTS

| | | |
|---|---|---|
| 28694/30 | 2/1931 | Australia . |
| 310/41 | 3/1942 | Australia . |
| 48002/68 | 6/1970 | Australia . |
| 238 426 | 9/1987 | European Pat. Off. ........ B60G 21/04 |
| 559171 | 2/1944 | United Kingdom . |
| WO 94/15567 | 7/1994 | WIPO ............... A61G 5/04 |

*Primary Examiner*—Kenneth R. Rice
*Attorney, Agent, or Firm*—Dougherty & Associates

[57] ABSTRACT

A mobile chassis (10) characterized by a central frame (12) which is supported by four wheels (60, 68, 74, 76). Wheels (74 and 76) are respectively support on one end of side beams (14 and 16) in turn pivotably mounted to central frame (12) at (70 and 72) to pivot about Y—Y axis. Wheels (66 and 68) are mounted on ends of a transverse beam (18) which is pivotably mounted at (52) to the central frame so that vertical movement of each wheel is compensated by pivoted movement of beams (14, 16 and 18). Rollers (56) and segments (42) constrain movement of the beam (18).

25 Claims, 11 Drawing Sheets

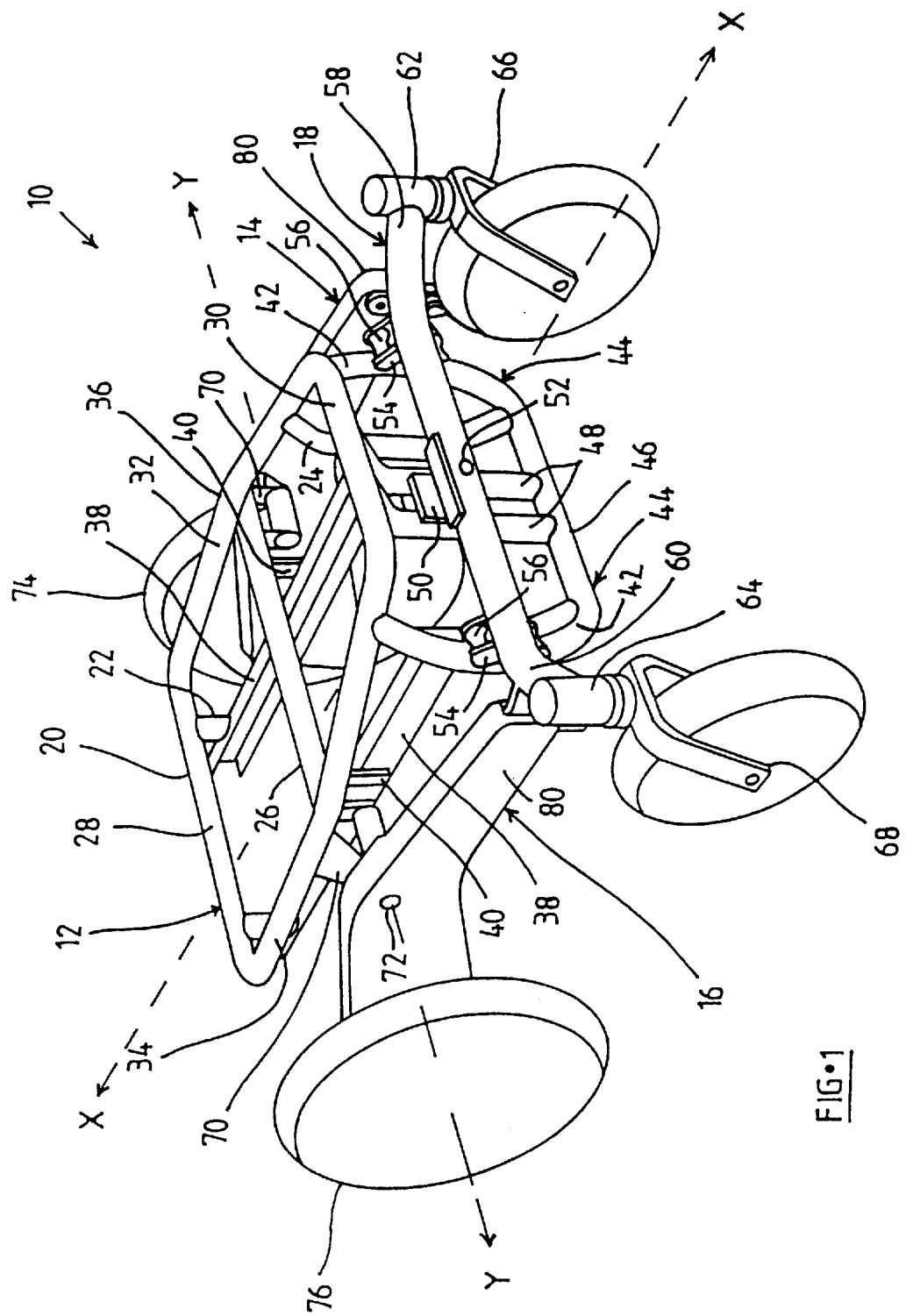
FIG·1

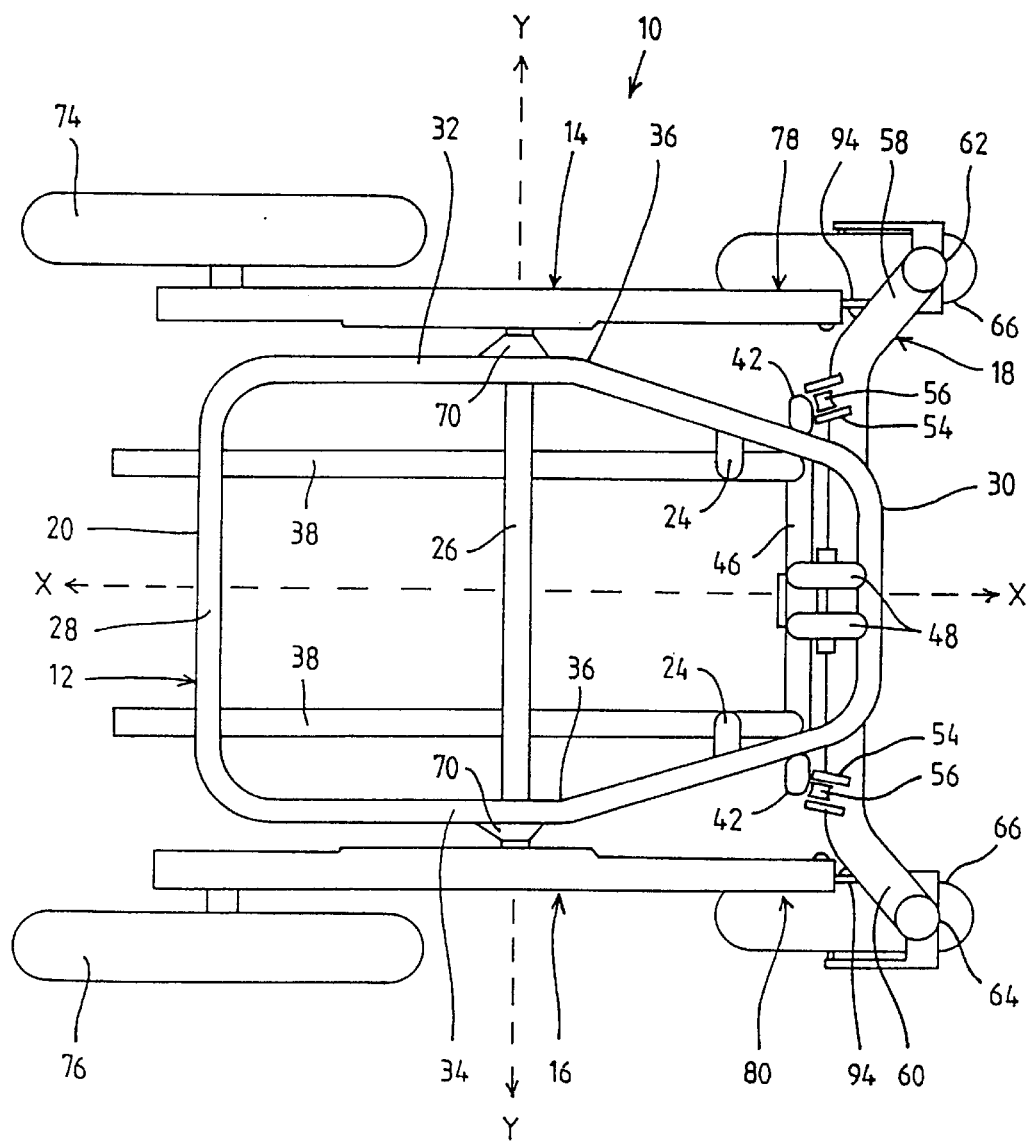

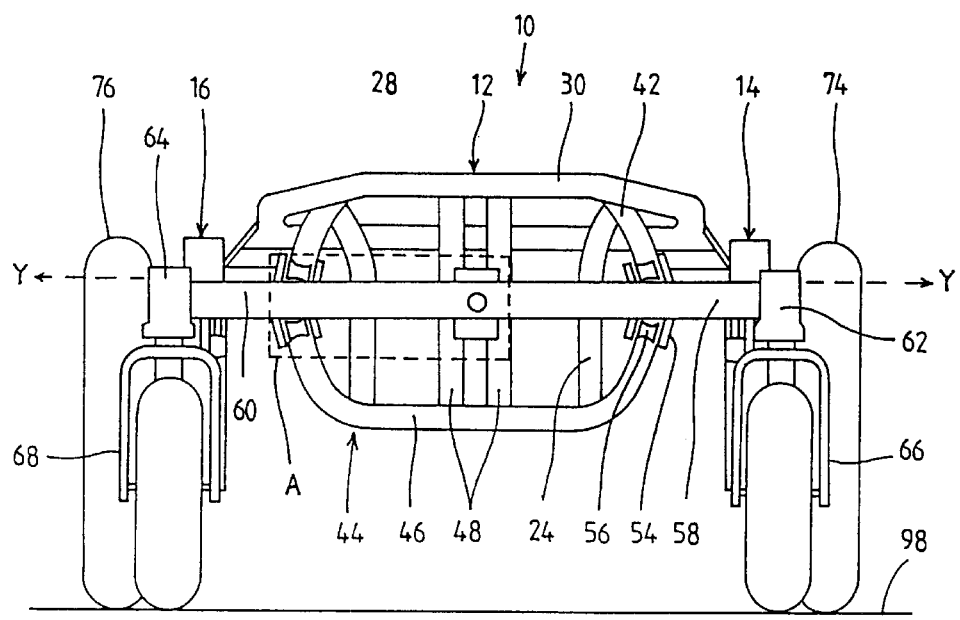
FIG·3

FIG·3a
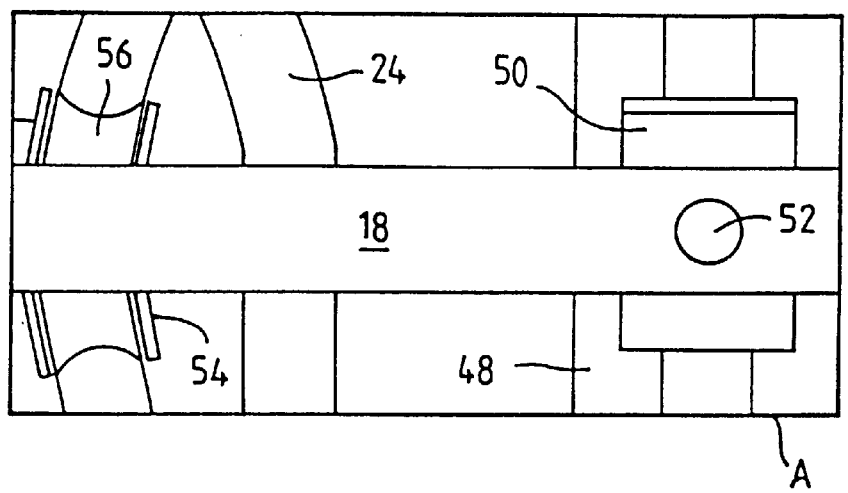
FIG·3b
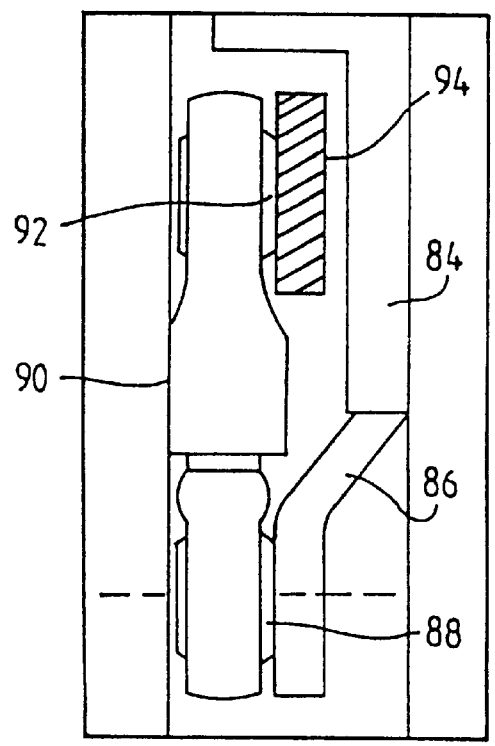

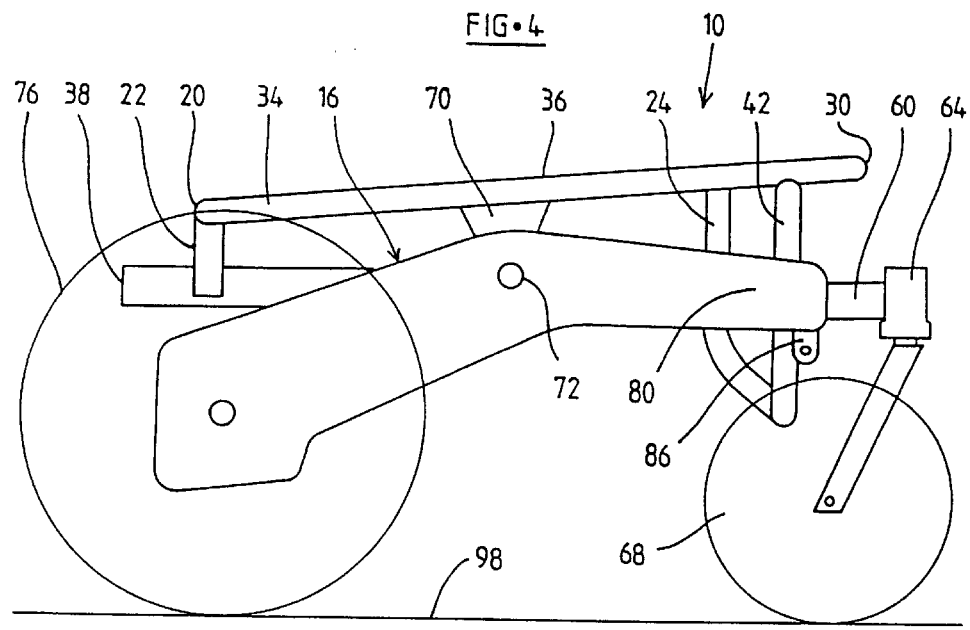
FIG·4
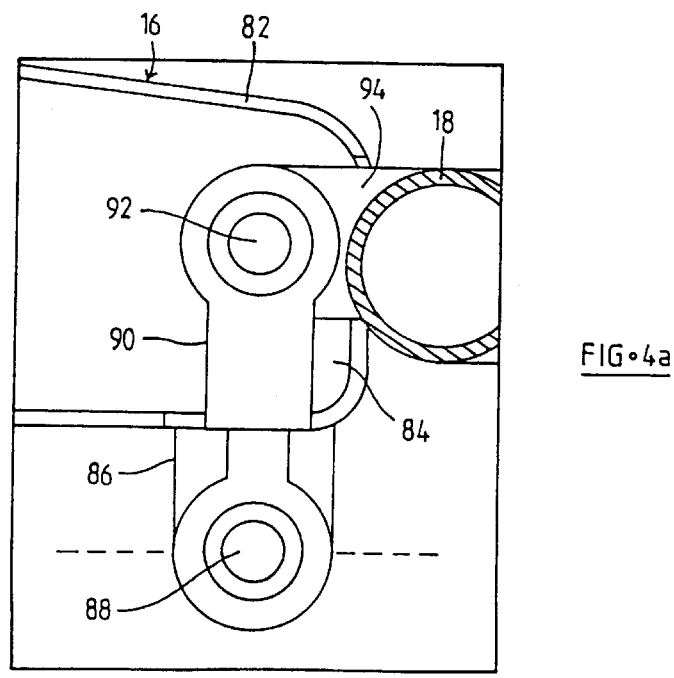
FIG·4a

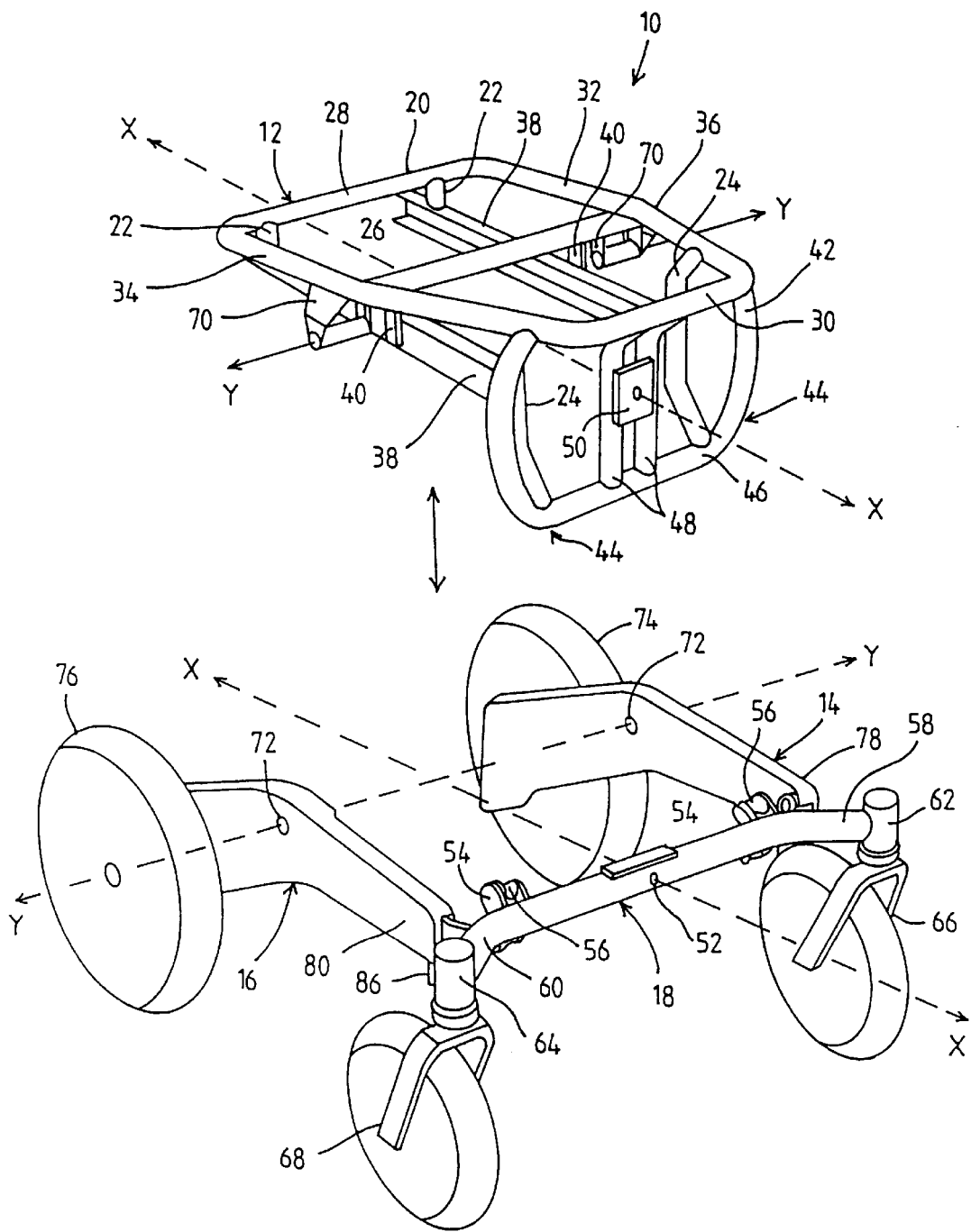
FIG·5

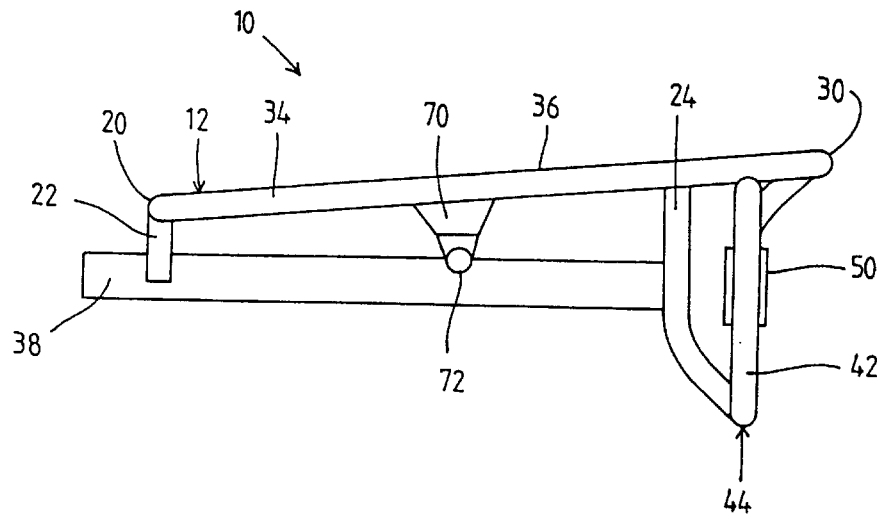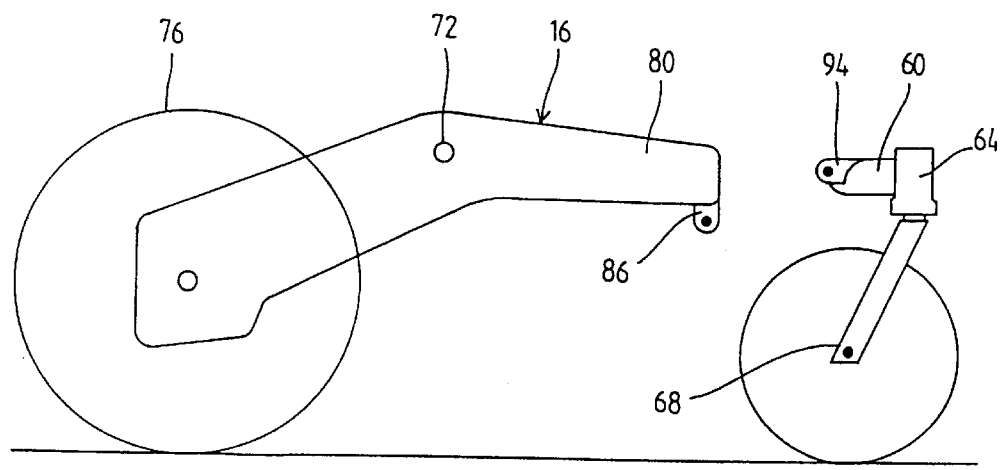
FIG·6

FIG·9

MOBILE CHASSIS

FIELD OF THE INVENTION

This invention relates to a mobile chassis. In particular, the mobile chassis of the present invention is intended for use as a chassis for wheelchairs, industrial robots, small vehicles or the like. Further, the mobile chassis is adapted so as to provide stability when traversing uneven surfaces and when mounting and dismounting kerbs and the like.

DISCUSSION OF THE PRIOR ART

The problem of instability of a mobile chassis, for example the chassis of a wheelchair, on uneven surfaces has typically been addressed by providing a chassis having both a forward portion and a rear portion. Both the forward and rear portions have a pair of wheels provided thereon and spaced transversely at either side of the chassis. A pivotal connection between the forward and rear portions has allowed independent pivoting thereof about an axis running substantially longitudinally with respect to the chassis.

However, the above-mentioned prior art does not succeed in markedly decreasing the transfer of tilt to the user of the wheelchair. If, for example the seat or chair portion of the wheelchair was mounted on the rear portion of the chassis then upon a single wheel provided on that rear portion being dropped or raised with respect to the remainder of the chassis, a substantial proportion of the resultant tilt will be transferred directly to the seat or chair portion.

Further, when one wheel mounted on the forward portion of chassis encounters an obstacle that wheel will be restrained at least partially as it moves over the obstacle. This imparts a twisting force to the chassis and can make the steering of the wheelchair difficult and even dangerous in certain circumstances.

A still further example of the prior art is a chassis for mobile devices such as wheelchairs comprising a central frame having a transverse member and an axial member, side frame members and a stabiliser member. The side frame members are pivotally mounted to respective ends of the transverse member and bear front and rear wheels. The stabiliser member interconnects the side frame members and the axial member in rotatable manner and is able to pivot about the axial member. The pivotal mounting of the side frames allowing limited pivotal movement of one side frame with respect to the transverse member and the other side frame. However, the pivotal movement of the side frames is rigidly linked and limited and consequently twisting and tilting forces are subsequently transferred to the central frame. Therefore, it is an aim of the present invention to provide a mobile chassis that minimises the above-mentioned problems of the prior art.

BRIEF DESCRIPTION OF THE INVENTION

The present invention provides a mobile chassis characterised by a central frame, two lateral frames and a forward transverse member, in which each of the lateral frames and forward transverse member are mounted to the central frame in a pivotal manner, the lateral frames having at least a single wheel provided thereon and being pivotally mounted to the central frame at either side thereof about a transverse axis whereas the forward transverse member has a pair of wheels provided thereon and is pivotal about a longitudinal axis, the central frame having provided therein a forward portion containing a pivotal mounting for the forward transverse member and further defining in part two guide members, each lateral frame and the forward transverse member having a pivotal connection provided therebetween such that pivotal forces resulting from obstacles encountered by the wheels of the forward transverse member are compensated at least in part by that pivotal connection.

Preferably, the forward transverse member has provided thereon two means for smooth engagement with the guide members so as to minimise any pivotal action in the forward transverse member about any axis other than the longitudinal axis of the mobile chassis. The two means for smooth engagement provided on the forward transverse member are preferably spaced equidistant from the longitudinal pivot thereof in a transverse manner.

The means for smooth engagement each preferably comprise two spaced apart rollers, the rollers being spaced apart in a substantially vertical plane one above and one below the transverse member and substantially parallel with that plane described by the guide members of the forward portion of the central frame. Accordingly, during pivotal movement of the transverse member about the longitudinal axis the means for smooth engagement remain in engagement with the guide members and thereby minimise twisting of the transverse member about either a transverse axis described by the transverse member or a vertical axis.

The pivotal connection provided between each lateral frame and the forward transverse member preferably comprises two vertically offset pivot points and an intermediate rod means provided therebetween, the offset pivot points each being provided in rigid communication with either the lateral frame or the transverse frame.

The wheel provided on each lateral frame is preferably spaced apart from the transverse pivot of the lateral frame in a direction substantially opposite to the pivotal connection of that lateral frame with the transverse member.

The present invention further provides a means for minimising the pivotal action of a transverse member mounted to a mobile chassis about any axis other than that described by that mounting comprising the pivotal mounting of the transverse member to a forward portion of the mobile chassis, characterised in that the forward portion comprises in addition to the mounting two guide members such that two means for smooth engagement provided on the transverse member abut the guide members, the means for smooth engagement being spaced equidistant from the pivotal mounting of the transverse member.

Preferably, as the transverse member is caused to pivot about the pivotal mounting the means for smooth engagement with the guide members prevent pivoting of the transverse member about any axis other than that described by the pivotal mounting.

DESCRIPTION OF THE DRAWINGS

The present invention will now be described, by way of example only, with reference to the accompanying drawings, in which:

FIG. 1 is an upper perspective view of a mobile chassis in accordance with the present invention;

FIG. 2 is a top plan view of the mobile chassis of FIG. 1;

FIG. 3 is a front view of the mobile chassis of FIG. 1 shown supported on a surface;

FIG. 3a is an enlarged view of the contents of box A of FIG. 3;

FIG. 3b is an enlarged view of the connection between the lateral frame and the transverse member shown from the front;

FIG. 4 is a side view of the mobile chassis of FIG. 1;

FIG. 4a is an enlarged view of the connection between the lateral frame and the transverse member shown from the side;

FIG. 5 is an exploded upper perspective view of the mobile chassis of FIG. 1 showing the central frame exploded from the lateral frames and transverse member;

FIG. 6 is an exploded side view of the mobile chassis of FIG. 1 showing each of the central frame, lateral frames and transverse member exploded;

DESCRIPTION

Figure 7:
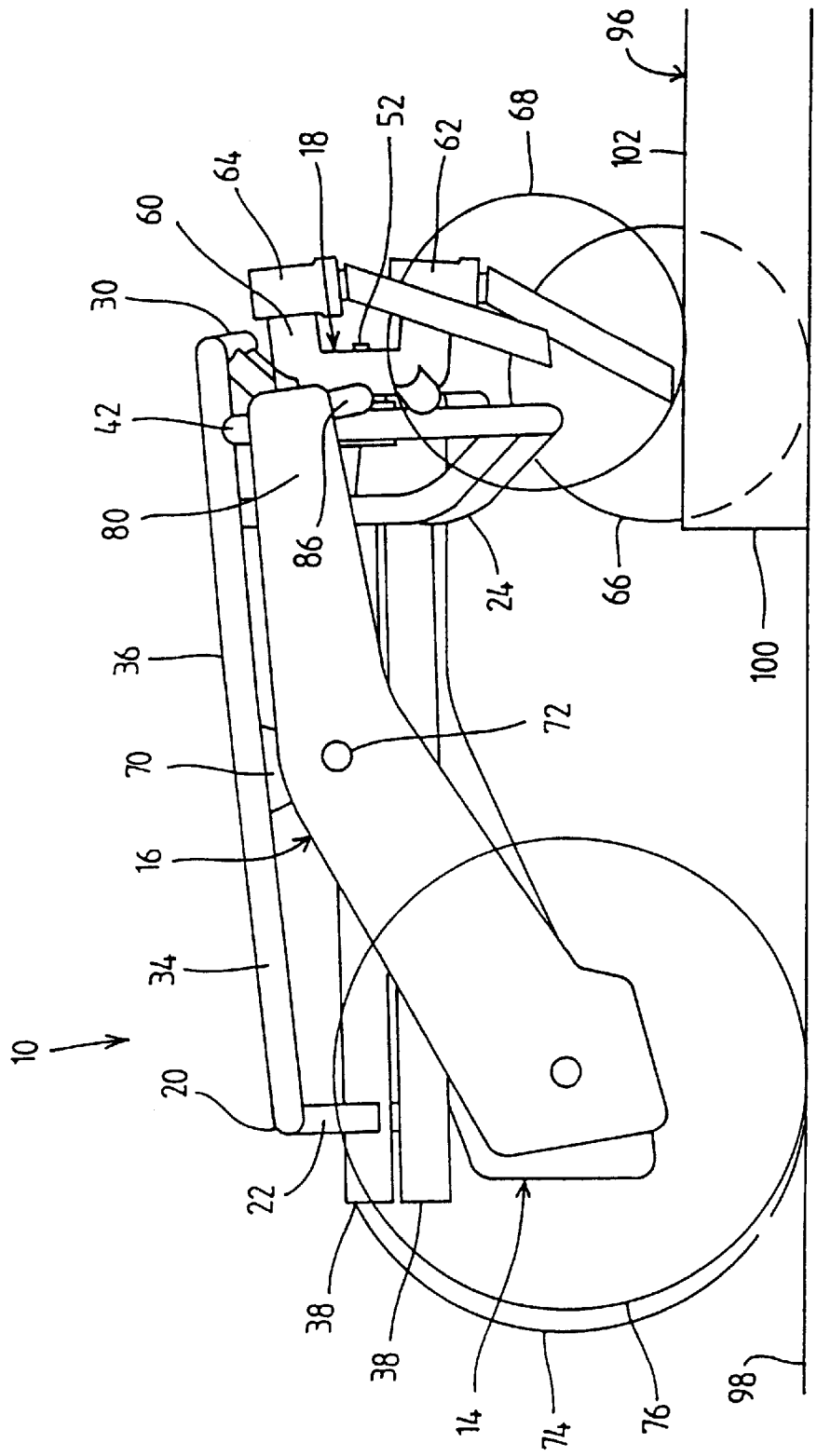
FIG. 7 is a side view of the mobile chassis of FIG. 1 showing one wheel of the transverse member mounting an obstacle.

In FIGS. 1 to 8 there is shown a mobile chassis 10 comprising a central frame 12, lateral frames 14 and 16, and a forward transverse member 18. The central frame 12 comprises an upper member 20, depending pairs of supports 22 and 24 and a central transverse member 26.

The upper member 20 has the form of a continuous but enclosed virgulate member having a rear linear portion 28 and a forward linear portion 30. The upper member 20 further comprises two lateral portions 32 and 34 extending between the respective opposed ends of portions 28 and 30. The portion 30 is shorter than the portion 28 and as such the lateral portions 32 and 34 have provided therein an inward kink 36 approximately mid-way therealong, as can be best seen in FIG. 2. The supports 22 depend from the portion 28 and each fixedly engage an elongate guide member 38. The guide members 38 are supported at an intermediate point by a pair of intermediate tabs 40 and at a forward end through fixed engagement with the supports 24.

The central frame 12 has depending therefrom two guide members 42 joined at their lower ends 44 by a linear portion 46 therebetween. The guide members 42 are substantially arcuate in form. The guide members 42 depend from the lateral portions 32 and 34 at a point rearward of, but substantially adjacent to the forward linear portion 30. A pair of brace members 48 depend from the forward linear portion 30 in a manner whereby the majority thereof lays in a substantially vertical plane defined by the guide members 42 and the linear portion 46, as is evident in FIG. 2. The brace members 48 are contiguous with the linear portion 46 at their lower ends.

A mounting plate 50 is fixed between the brace members 48 so as to provide a mounting for a pivotal attachment 52 of the forward transverse member 18. As such, the forward transverse member 18 is able to pivot about an axis X—X longitudinal to the mobile chassis 10 and central to the central frame 12. The forward transverse member 18 has provided thereon two means for smooth engagement with the guide members 42, for example guide mountings 54 having provided therein a pair of rollers 56. One roller 56 of each pair thereof is spaced apart from the transverse member 18 by the mountings 54 an equal distance either side thereof in a substantially vertical plane, as can be best seen in FIGS. 1 and 3. Each mounting 54 comprises a pair of V-shaped brackets, the base of these brackets being fixed to the transverse member 18 and the rollers 56 being held rotatably between the arms of the V-shaped brackets, as can be best seen in FIG. 3a. The V-shaped brackets are provided in arcuate orientation corresponding to the arcuate form of the guide members 42.

At each end 58 and 60 of the transverse member 18 is provided a mounting 62 and 64 respectively for the rotatable retention of a castor wheel, 66 and 68 respectively. The transverse member 18 has provided therein adjacent each end 58 and 60 a forwardly projecting kink, as is best seen in FIG. 2, whereby the mountings 62 and 64 are positioned further forward than the transverse member 18 at and between the guide mountings 54.

Provided rearward of but adjacent to the kink 36 in each lateral portion 32 and 34 is a pivot mounting 70 providing a pivotable attachment 72 between it and the lateral frames 14 and 16, about a transverse axis Y—Y. Each lateral frame 14 and 16 has provided thereon a rotatably mounted wheel, 74 and 76 respectively. The wheels 74 and 76 are offset rearwardly and downwardly of the pivotable attachments 72 and axis Y—Y, as can be seen in FIGS. 1 and 2.

A forward end 78 and 80 respectively of the lateral frames 14 and 16 comprise an upper plate 82 and a depending outer plate 84. A further mounting tab 86 depends from each plate 84 and has provided on an inner surface thereof a gimbal mounting 88 for a lower end of an intermediate rod 90, best seen in FIGS. 3b and 4a, which allows limited rotation about an axis parallel to axis X—X and a greater rotation about an axis parallel to axis Y—Y. An upper end of the intermediate rod 90 has provided thereon a further gimbal mounting 92. The gimbal mounting 92 joins the intermediate rod 90 to a tab means 94 projecting rearwardly from the transverse member 18, as can be best seen in FIGS. 2, 4a and 6. Again, the gimbal mounting 92 allows limited rotation about an axis parallel to axis X—X and a greater rotation about an axis parallel to axis Y—Y.

Figure 8:
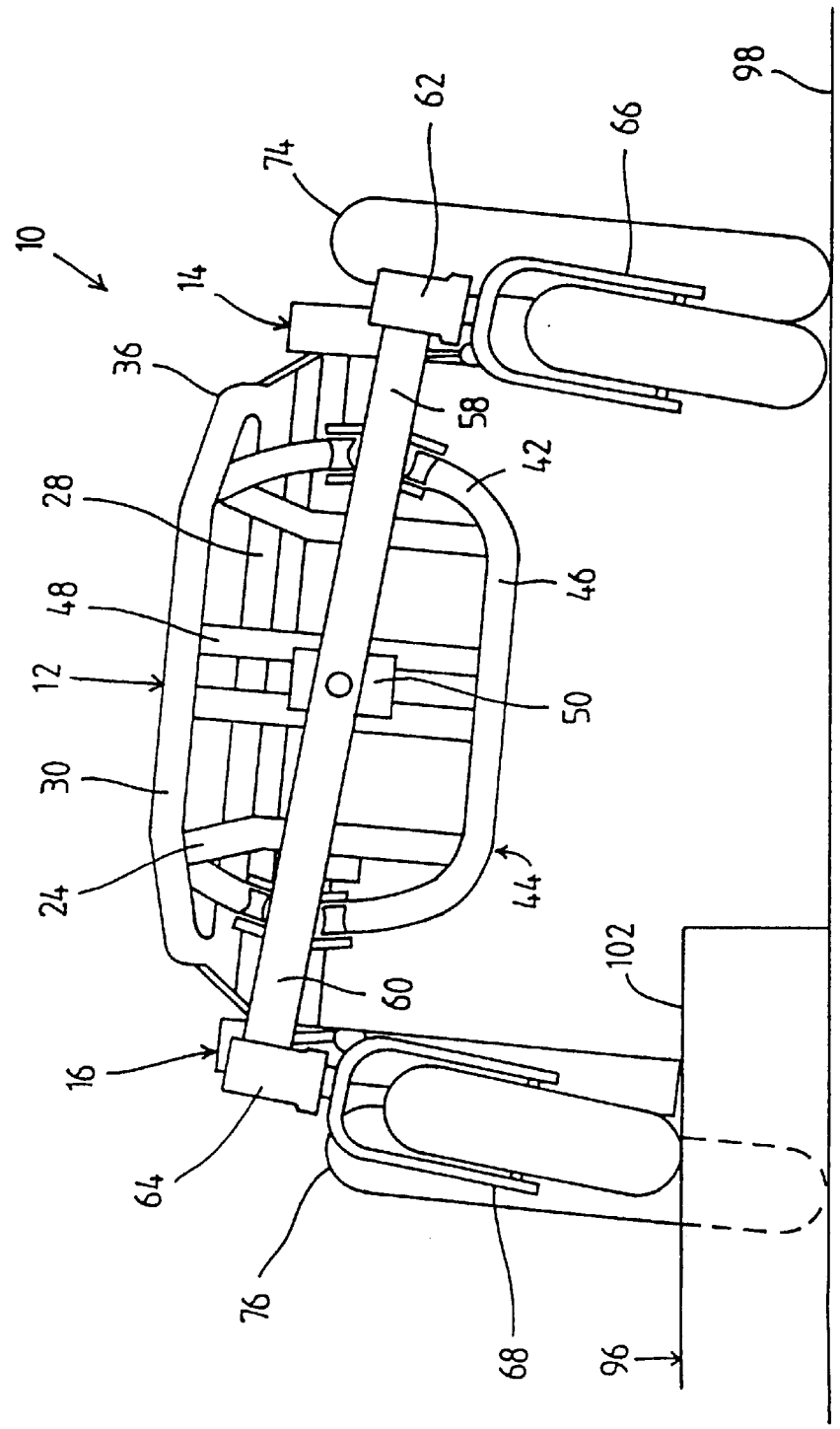
FIG. 8 is a front view of the mobile chassis as shown in FIG. 7 in reversed orientation.

In FIGS. 7 and 8 there is shown the mobile chassis 10 of which the castor wheel 68 has mounted an obstacle 96 provided on a surface 98 supporting the remainder of the wheelchair chassis 10. The obstacle 96 has a flat face 100 and an upper surface 102 on which the castor wheel 66 is located.

Figure 9:
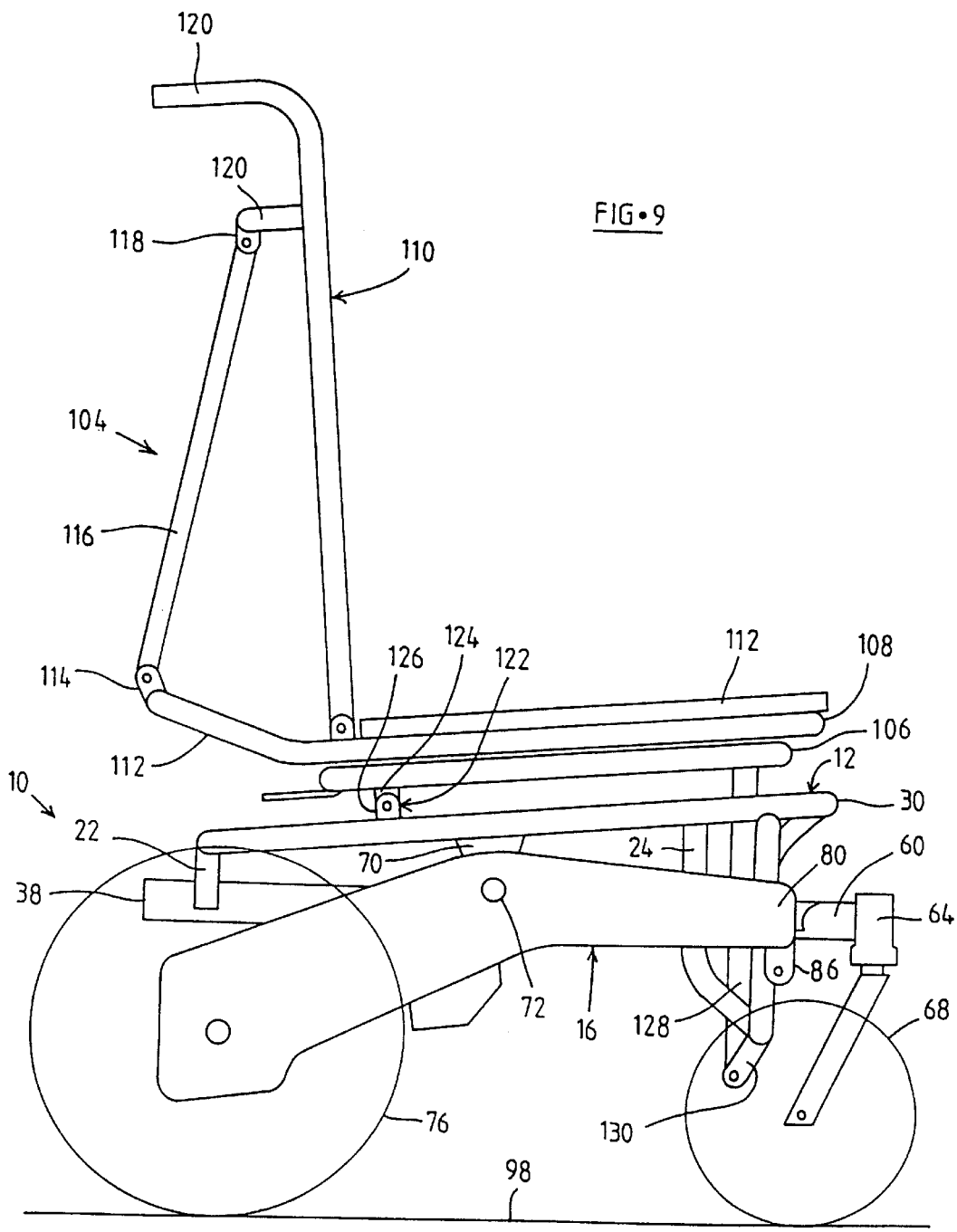
FIG. 9 is a side view of the mobile chassis of FIG. 1 having a seat portion located on the central frame.
Figure 10:
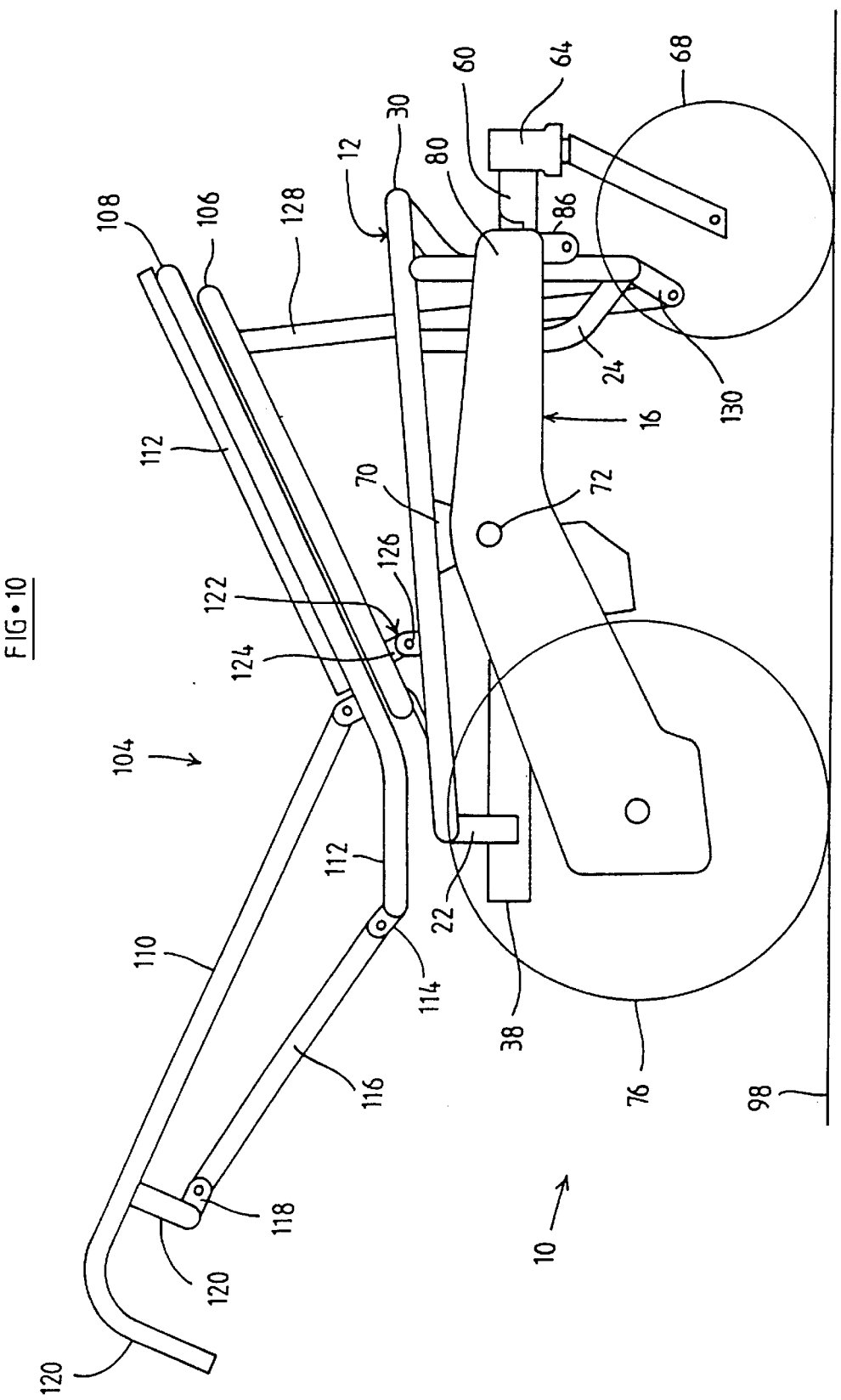
FIG. 10 is a side view of the mobile chassis and seat portion of FIG. 9 showing the seat portion in a reclined position.

In FIGS. 9 and 10 there is shown the mobile chassis 10 on which a seat portion 104 is positioned. The seat portion 104 comprises a base frame member 10 supporting an upper frame member 108 which in turn has located thereon a back rest member 110. A cushioned surface 112 is provided over the upper frame member 108. The upper frame member 108 has a rearward extension 112 from which extends a tab means 114. A kink member 116 is pivotally connected to the tab means 114 at one end and at the other end thereof to a further tab means 118. The tab means 118 is provided depending from a rearward extension 120 of the back rest member 110. The back rest member 110 further has provided at an upper end thereof an integrally formed handle means 120. The back rest member 110 is attached in a pivotal manner to the upper frame member 108.

The seat portion 104 is located on the mobile chassis 10 in part by way of two pairs of complimentary attachment means 122, only one of which is visible in FIGS. 9 and 10. The attachment means 122 each comprise a tab 124 depending from the base frame 106 and an upstanding tab 126 provided on the lateral portion 32 of the upper member 20 and a pivotal connection therebetween. Further location of the seat portion 104 is achieved through a pair of depending elongate members 128 provided at a forward end of the base frame 106. The elongate members 128 are received at a lower end thereof in a pivotal manner in mountings 130 located on the linear portion 46 of the arcuate members 42.

In use, the mobile chassis 10 may be used as the chassis for a motor driven wheelchair in which a motor is provided to drive each wheel 74 and 76 independently. The motors are electrically connected to one or more batteries (not shown) provided in a container (not shown) that is supported beneath the wheelchair chassis 10 by locating engagement with the elongate guide members 38.

The chassis 10 is able to be driven in both forward and backward directions through drive applied to the wheels 74 and 76. As each of the wheels 74 and 76 have drive applied to them individually it is possible to steer the wheelchair chassis 10 through applying different magnitudes or directions of drive to the individual wheels 74 and 76. The wheels 66 and 68 are able to castor within their mountings 62 and 64 and thereby will follow the direction of movement imparted by the motors to the wheelchair chassis 10.

When the chassis 10 is resting on or moving forward across the smooth surface 98 the orientation thereof is substantially as shown in FIGS. 3 and 4. In this position the transverse member 18 is substantially parallel to the surface 98 and each guide mounting 54 provided thereon is at the same position on the guide members 42. Still further, the particular orientation of each lateral frame 14 and 16 is substantially similar. However, it is possible that during forward movement of the chassis 10 it will be necessary to pass over an obstacle such as the obstacle 96, best seen in FIGS. 7 and 8.

As the castor wheel 66 provided in the mounting 62 first abuts the face 100 of the obstacle 96 a resistance pressure or force is transferred through the mounting 62 to the transverse member 18. In turn, this pressure is transferred through the guide mounting 54 adjacent the end 58 of the transverse member 18. Still further, this pressure is transferred to the guide member 42 through the pair of rollers 56 provided in the guide mounting 54. The transfer of pressure or force in this manner from the castor wheel 66 serves to minimise any twisting action of the transverse member 18 about a substantially vertical axis. The spacing of the rollers 56 in a vertical plane apart from the transverse member 18 on either side thereof minimises any twisting in the transverse member 18 about a transverse axis described thereby.

As additional forward drive is exerted through the wheels 74 and 76 the castor wheel 68 provided in mounting 64 will mount the obstacle 96 so as to rest on the upper surface 102 thereof, as can be best seen in FIGS. 7 and 8. In this position the lateral frame 16 is caused to pivot about the pivotable attachment 72 and axis Y—Y. This pivoting of the lateral frame 16 causes the wheel 76 to move slightly forward of the wheel 74 and for the forward end 80 to be raised. Further, the transverse member 18 is no longer positioned substantially parallel to the surface 98 but has pivoted about its pivotal attachment 52 to the mounting plate 50 and about axis X—X. Further, the guide mounting 54 adjacent the end 60 of the transverse member 18 has moved along the guide member 42 closer to the upper member 20. A complimentary travel in the other guide member 54 adjacent the end 58 of the transverse member 18 results in it moving closer to the lower end 44 of the guide members 42. Such a pivoting movement about axis X—X of the transverse member 18 causes inturn a pivoting in the gimbal mountings 88 and 92.

The gimbal mountings 88 and 92 allow rotation therein about an axis parallel to axis Y—Y whilst also allowing some rotation about an axis parallel with axis X—X. As the castor wheel 68 in the mounting 64 is raised with respect to the castor wheel 66 in the mounting 62 there is a tendency for the end 80 of the lateral side frame 16 to pull rearwardly away from the end 60 of the transverse member 16. As this occurs, the intermediate rod 90 through its gimbal mounting 92 to the tab means 44 will follow the transverse member 18. This requires a corresponding rotation in the gimbal mounting 88 to the mounting tab 86 of the lateral frame 16. The forward end 78 of the lateral frame 14 is concurrently lowered with respect to the castor mounting 62. This also will cause the forward end 78 of the lateral frame 14 to pull rearwardly away from the tab means 94 provided on the end 58 of the transverse member 18. Such an action causes rotation in the gimbal mountings 88 and 92 and a slanting of the orientation of the intermediate rod 90 from the vertical.

Further, there is a consequent inward movement of each end 58 and 60 of the transverse member 18 during pivoting of the transverse member 18. Such inward movement of each tab means 94 with respect to the forward ends 78 and 80 of the lateral frames 14 and 16 is catered for through the limited rotation of the gimbal mountings 88 and 92 about an axis parallel with axis X—X. Such movement does not require any pivoting of the lateral frames 14 and 16 about any axis other than axis Y—Y and consequently keeps the wheels 74 and 76 aligned correctly with the direction of movement of the chassis 10.

If both the castor wheel 68 provided in the mounting 64 and the wheel 76 of the lateral frame 16 were to mount the obstacle 96 at the same time then the transverse member 18 would return to an orientation in which the guide mountings 54 were each in a substantially similar position relative to the guide members 42. If only the wheel 76 of the lateral frame 16 were to be located on the obstacle 96 and the castor wheel 68 provided in the mounting 64 was located on the surface 98 then the forward end 80 of the lateral frame 16 would be lowered with respect to the forward end 78 of the lateral frame 14 causing the transverse member 18 to pivot about its pivotable attachment 54 and axis X—X. As described hereinabove, any twisting force imparted by such an orientation of the wheelchair chassis 10 is minimised through the abuting action of the rollers 56 against the guide members 42. In such an orientation the rotation of the gimbal mountings 88 and 92 and the movement of the intermediate rod 90 would be substantially similar to but reversed with respect to that described hereinabove in the case of the castor wheel 68 being located on the obstacle 96.

The provision of the rear wheels 74 and 76 in spaced apart or offset relation to the pivotable attachment 72 of the lateral frames 14 and 16 to the central frame 12 allows the degree of tilt transferred to the central frame 12 by the wheels 74 and 76 to be minimised. Any twisting force applied to the chassis 10 through the castor wheels 66 and 68 abuting and mounting an obstacle 96 is minimised through the abuting of the rollers 56 with the guide members 42 and the concurrent pivoting of the lateral members 14 and 16 which in turn alters the orientation of the wheels 74 and 76 through pivoting thereof about the pivotable attachment 72. Further, the particular arrangement provided for attachment of the transverse member 18 to the lateral frames 14 and 16 minimises the transfer of any twisting force to the lateral members 14 and 16 and consequently to the central frame 12 upon which the seat portion 104 may be provided, as can be seen in FIGS. 9 and 10.

The seat portion 104 allows the reclining of a person (not shown) seated thereon. This is possible through the pivotal attachment of the base frame 106 to the chassis 10, as described hereinabove and the pivotable attachment of the back rest member 110 to the upper frame member 108.

It is envisaged that the mobile chassis 10 of the present invention may be used as a chassis in applications other than wheelchairs where increased stability is desired such as industrial robots, small vehicles and the like.

It should be appreciated that modifications and variations such as would be apparent to the skilled addressee are considered to fall within the scope of the present invention.

We claim:

1. A mobile chassis characterised by a central frame, two lateral frames and a forward transverse member, in which each of the lateral frames and forward transverse member are mounted to the central frame in a pivotal manner, the lateral frames having at least a single wheel provided thereon and being pivotally mounted to the central frame at either side thereof about a transverse axis whereas the forward transverse member has a pair of wheels provided thereon and is pivotal about a longitudinal axis, the central frame having provided therein a forward portion containing a pivotal mounting for the forward transverse member and further defining in part two guide members, each lateral frame and the forward transverse member having a pivotal connection provided therebetween such that pivotal forces resulting from obstacles encountered by the wheels of the forward transverse member are compensated at least in part by that pivotal connection.

2. A mobile chassis according to claim 1, characterised in that the forward transverse member has provided thereon means for smooth engagement with the guide members so as to minimise any pivotal action in the forward transverse member about any axis other than the longitudinal axis of the mobile chassis.

3. A mobile chassis according to claim 2, characterised by two means for smooth engagement being provided on the forward transverse member and being spaced equidistant from the longitudinal pivot thereof in a transverse manner.

4. A mobile chassis according to claim 2, characterised in that the means for smooth engagement each comprise two spaced apart rollers.

5. A mobile chassis according to claim 4, characterised in that the rollers are spaced apart in a substantially vertical plane one above and one below the transverse member and substantially parallel with that plane described by the guide members of the forward portion of the central frame.

6. A mobile chassis according to claim 5, characterised such that during pivotal movement of the transverse member about the longitudinal axis of the central frame the means for smooth engagement remain in engagement with the guide members and thereby minimise twisting of the transverse member about either a transverse axis described by the transverse member or a vertical axis, the guide members being provided in arcuate form.

7. A mobile chassis according to claim 1, characterised in that the pivotal connection provided between each lateral frame and the forward transverse member comprises two vertically offset pivot points and an intermediate rod means provided therebetween.

8. A mobile chassis according to claim 7, characterised whereby the two offset pivot points are provided in rigid communication with either the lateral frame or the transverse member.

9. A mobile chassis according to claim 7, characterised in that the pivot points comprise gimbal mountings allowing at least limited rotation about three axes.

10. A mobile chassis according to claim 9, characterised in that greater movement is possible in the gimbal mountings about the axis extending transversely with respect to the central frame than is possible in the remaining two axes.

11. A mobile chassis according to claim 9, characterised in that an upper end of the intermediate rod has provided thereon one of the gimbal mountings linking same with the lateral frame.

12. A mobile chassis according to claim 9, characterised in that a lower end of the intermediate rod has provided thereon one gimbal mounting linking same with the transverse frame.

13. A mobile chassis according to claim 4, characterised in that the spaced apart rollers are mounted in a pair of brackets in arcuate orientation corresponding to the arcuate form of the arcuate members of the forward portion of the central frame.

14. A mobile chassis according to claim 13, characterised in that the pair of brackets are formed in a V-shape and have their base fixed to the transverse member.

15. A mobile chassis according to claim 1, characterised in that the forward transverse member has provided at each end thereof a castor wheel in a rotatable mounting.

16. A mobile chassis according to claim 15, characterised in that the transverse member has provided therein adjacent each end thereof a forwardly projecting kink such that the rotatable mountings are positioned further forward than the transverse member at and between the arcuate members.

17. A mobile chassis according to claim 1, characterised whereby the wheel provided on each lateral frame is spaced apart from the transverse pivot of the lateral frame in a direction substantially opposite to the pivotal connection of that lateral frame with the transverse member.

18. A mobile chassis according claim 2, characterised in that upon a wheel of the forward transverse member abutting an obstacle the resistance pressure is transferred through the means for smooth engagement from the transverse member to the guide member thereby minimising any twisting action of the transverse member about a substantially vertical axis.

19. A mobile chassis according to claim 15, characterised in that upon one wheel of the forward transverse member mounting an obstacle the transverse member pivots about the longitudinal axis of the chassis and the lateral frame linked to the raised end of the transverse member is caused to pivot about the transverse axis of the chassis such that the or each wheel provided thereon is moved forward relative to the or each wheel provided on the other lateral frame.

20. A means for minimising the pivotal action of a transverse member mounted to a mobile chassis about any axis other than that described by that mounting comprising the pivotal mounting of the transverse member to a forward portion of the mobile chassis, characterised in that the forward portion comprises in addition to the mounting two guide members such that two means for smooth engagement provided on the transverse member abut the guide members, the means for smooth engagement being spaced substantially equidistant from the pivotal mounting of the transverse member.

21. A means according to claim 20, characterised in that the means for smooth engagement with the guide members prevent pivoting of the transverse member about any axis other than that described by the pivotal mounting.

22. A means according to claim 20, characterised in that the means for smooth engagement each comprise two spaced apart rollers.

23. A means according to claim 22, characterised in that the rollers are spaced apart in a substantially vertical plane one above and one below the transverse member and substantially parallel with that plane described by the guide members of the forward portion of the mobile chassis.

24. A means according to claim 23, characterised in that the guide members are of arcuate form and the spaced apart rollers are mounted in a pair of brackets in arcuate orientation corresponding to the arcuate form of the guide members of the forward portion of the mobile chassis.

25. A means according to claim 24, characterised in that the pair of brackets are formed in a V-shape and have their base fixed to the transverse member.

* * * * *